US009585363B2

(12) United States Patent
Casto (10) Patent No.: US 9,585,363 B2
(45) Date of Patent: Mar. 7, 2017

(54) PET HABITAT WITH DISPOSABLE BEDDING LINER (71) Applicant: CENTRAL GARDEN & PET COMPANY, Walnut Creek, CA (US)

(72) Inventor: Jason Casto, Lombard, IL (US)

(73) Assignee: CENTRAL GARDEN & PET COMPANY, Walnut Creek, CA (US)

(*) Notice: Subject to any disclaimer, the term of this patent is extended or adjusted under 35 U.S.C. 154(b) by 148 days.

(21) Appl. No.: 14/186,334

(22) Filed: Feb. 21, 2014

(65) Prior Publication Data

US 2015/0237822 A1    Aug. 27, 2015

(51) Int. Cl.
A01K 1/00    (2006.01)
A01K 1/03    (2006.01)
A01K 1/01    (2006.01)
A01K 31/04   (2006.01)

(52) U.S. Cl.
CPC ............. A01K 1/03 (2013.01); A01K 1/0125 (2013.01); A01K 31/04 (2013.01)

(58) Field of Classification Search
CPC . A01K 1/03; A01K 1/015; A01K 4/52; A01K 1/0157
USPC .......... 119/452, 462, 480, 165, 166
See application file for complete search history.

(56) References Cited

U.S. PATENT DOCUMENTS

| | | | | |
|---|---|---|---|---|
| 4,171,680 A * | 10/1979 | Silver | ................. | A01K 1/0107 119/165 |
| 4,217,857 A * | 8/1980 | Geddie | ............... | A01K 1/0114 119/166 |
| 5,499,610 A * | 3/1996 | Bruner | ................ | A01K 1/0114 119/165 |
| 6,067,939 A * | 5/2000 | Tominaga | ............... | A01K 1/03 119/474 |
| 6,745,719 B1 * | 6/2004 | Howerton | ........... | A01K 1/0114 119/166 |
| 7,665,420 B2 * | 2/2010 | Plante | .................... | A01K 31/06 119/461 |
| 2006/0037549 A1 * | 2/2006 | Kim | ..................... | A01K 1/0114 119/166 |
| 2007/0292559 A1 * | 12/2007 | Garwood | ............ | A22B 5/0029 426/2 |

* cited by examiner

Primary Examiner — Monica Willams
Assistant Examiner — Aaron Rodziwicz
(74) Attorney, Agent, or Firm — Grossman, Tucker, Perreault & Pfleger, PLLC

(57) ABSTRACT

A pet habitat comprising a cage structure supported on a base structure, the base structure comprising a reusable tray and a disposable liner, the disposable liner comprising a disposable tray locatable within the reusable tray and the disposable tray having two opposing sides, wherein each of the opposing sides includes a deformable pull tab to separate the disposable tray from the reusable tray.

21 Claims, 6 Drawing Sheets

PET HABITAT WITH DISPOSABLE BEDDING LINER

FIELD OF THE INVENTION

The present disclosure relates to pet habitats, and more particularly to pet habitats with a disposable bedding liner.

BACKGROUND

The cleaning of pet habitats is often a cumbersome and relatively time-consuming task for pet owners. Many pet habitats include a base structure into which bedding material for the pet is placed, with the base structure being a permanent part of the pet habitat. The base structure typically must be removed from the habitat and thereafter cleaned to remove the contents therein, which often includes food and pet waste in addition to the bedding material. As such, the process is labor intensive and requires considerable time. What is needed is a pet habitat and method of use to reduce the labor associated with the cleaning of pet habitats by the pet owners.

SUMMARY

A pet habitat comprising a cage structure supported on a base structure wherein the base structure includes a reusable tray configured to contain a disposable tray. The reusable tray has opposing sidewalls wherein each sidewall of the reusable tray includes a plurality of ribs extending vertically on the sidewall, wherein an open space is present between the ribs. The disposable tray has a peripheral lip and opposing sidewalls corresponding to the opposing sidewalls of the reusable tray wherein a deformable pull tab is present along an edge of the peripheral lip and between a plurality of notches in the peripheral lip. Each rib of the plurality of ribs extending vertically on each of the opposing sidewalls of the reusable tray is locatable in one notch of the plurality of notches present on each of the opposing sides of the disposable tray.

The present disclose also relates to a disposable tray for a pet habitat containing a reusable tray wherein the reusable tray includes opposing sidewalls wherein each sidewall of the reusable tray includes a plurality of ribs extending vertically on the sidewall, wherein an open space is present between the ribs. The disposable tray includes a peripheral lip and opposing sidewalls corresponding to the opposing sidewalls of the reusable tray. A deformable pull tab is present along an edge of the peripheral lip and between a plurality of notches in the peripheral lip. Each rib of the plurality of ribs on the reusable tray extends vertically on each of the opposing sidewalls and the ribs are locatable in the notches on each of the opposing sides of the disposable tray.

The present disclosure also relates to a method of providing a pet habitat, comprising providing a base structure including a reusable tray and a disposable tray. The reusable tray and disposable tray are as disclosed above. One may then position the plurality of ribs extending vertically on each of the opposing sidewalls of the reusable tray within the plurality of notches formed in the peripheral lip on each of the opposing sides of the disposable tray. This may be followed by moving the deformable pull tabs into the open space between the ribs and then into a grasping position.

In certain embodiments, the method my further comprise moving each of the deformable pull tabs upward, grasping each of the pull tabs and pulling the each of the deformable pull tabs upwards such that the disposable tray moves upwards relative to the reusable tray with the deformable pull tabs remaining between the plurality of ribs extending vertically on each of the opposing sidewalls of the reusable tray.

In certain embodiments, the method my further comprise moving the disposable tray upward out of the reusable tray such that the plurality of ribs extending vertically on each of the opposing sidewalls of the reusable tray remain within the plurality of notches formed in the peripheral lip on each of the opposing sides of the disposable tray and the plurality of notches formed in the peripheral lip on each of the opposing sides of the disposable tray travel upwards along a length of the plurality of ribs extending vertically on each of the opposing sidewalls of the reusable tray as the disposable tray is removed from the reusable tray.

In certain embodiments, the method my further comprise moving the disposable tray downward into the reusable tray such that the plurality of ribs extending vertically on each of the opposing sidewalls of the reusable tray remain within the plurality of notches formed in the peripheral lip on each of the opposing sides of the disposable tray and the plurality of notches formed in the peripheral lip on each of the opposing sides of the disposable tray travel downwards along a length of the plurality of ribs extending vertically on each of the opposing sidewalls of the reusable tray as the disposable tray is inserted into the reusable tray.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

The present disclosure is generally directed to a pet habitat configured to provide a relatively easy means of cleaning debris, including, but not limited to pet bedding, food particles and pet waste from the habitat. Generally, a pet habitat consistent with the present disclosure includes a cage structure coupled to a base structure to provide an enclosure for one or more pets to be kept in captivity. The base structure may include a reusable tray having a disposable liner located therein. It is an object to the present disclosure to provide a disposable liner which, after a period of use, may be easily separated from the reusable tray without spilling the contents therein and discarded. A replacement disposable liner may then be placed in the reusable tray without having to manually clean the reusable tray, thus expediting cleaning of the pet habitat.

Figure 1A:
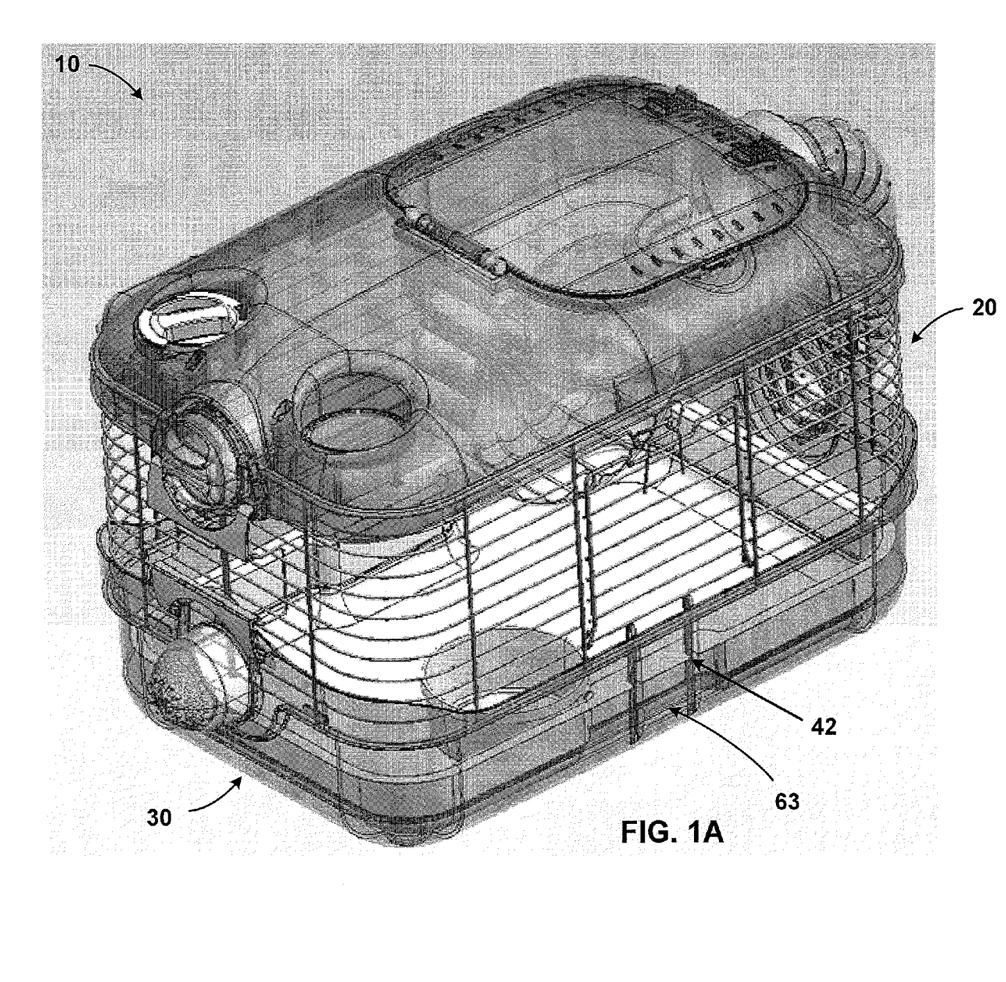
FIG. 1A is a perspective view of a pet habitat according to the present disclosure.
Figure 1B:
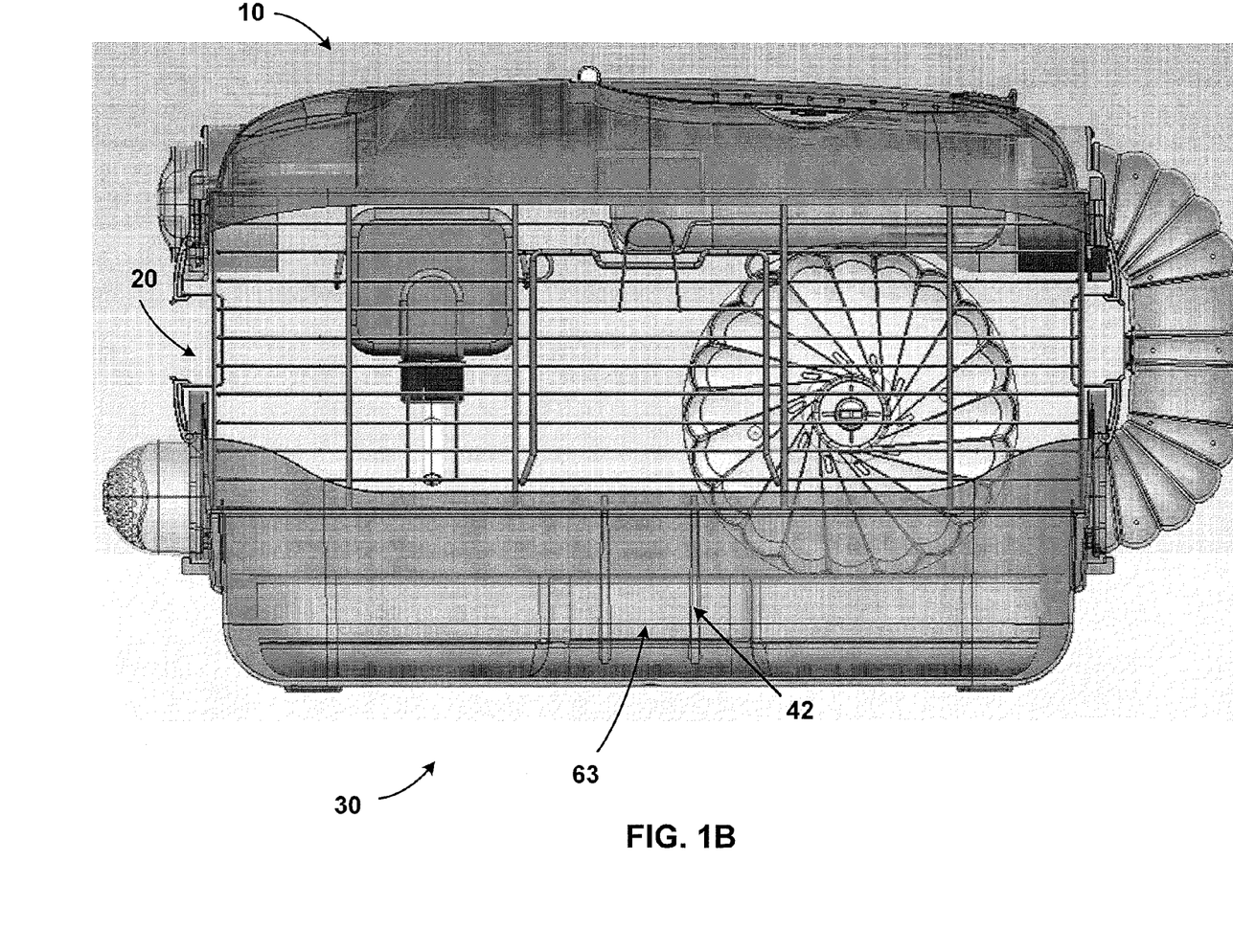
FIG. 1B is a side view of a pet habitat of FIG. 1A.

Referring now to the figures, FIGS. 1A and 1B show perspective and side views of a pet habitat 10 according to the present disclosure. In the present embodiment, pet habitat 10 may be particularly configured and arranged to contain one or more rodents such as, for example, mice, gerbils, hamsters, rats and guinea pigs.

As shown, the pet habitat 10 may include a cage structure 20 as an upper portion and a base structure 30 as a lower portion. Cage structure 20 and base structure 30 are connectable to one another, particularly by mechanical engagement, to provide an enclosed pet habitat 10.

Cage structure 20 provides a viewing structure to view a pet contained in the pet habitat 10, as well as a ventilation structure through which a pet contained in the pet habitat 10 may breathe. Cage structure 20 may have a substantially rectangular shape provided by a two sets of opposing sidewalls, as well as a top wall. As shown, each of the walls may be substantially planar and may be coupled to one another such that the cage structure 20 provides the substantially rectangle structure.

As shown, cage structure 20 does not include a bottom wall which separates the cage structure 20 from the base structure 30, as such may hurt or damage the pet's paws/feet as a result of the discontinuity of the surface. In this manner, without a bottom wall to the cage structure 20, the pet(s) within the pet habitat 10 may tread on bedding and other soft surfaces within the base structure 30 without injury to their paws/feet.

In certain embodiments, as shown, the cage structure 20 may be in the form of a wire cage, which may comprise metal wire. However, it should be understood that, in other embodiments, the walls may be formed of other structures. For example, the walls may be formed of plastic, such as formed of a thermoplastic, which may be translucent and may further be transparent, with breathing apertures formed therein. The cage structure 20 may also used to support various items contained therein for use of the pet(s), which may include an exercise/running wheel, one or more landings, food trays and/or water bottles.

The walls may be coupled to one another by a variety of known fastening structures and methods. For example, some of the walls may be coupled to one another by way of one or more hinges and snap-fit members. The cage structure 20 may be of modular nature such that all of the walls may be formed separate from one another, or unitary such that the walls are formed from one continuous member. The cage structure 20 may further be of foldable construction, where some of the walls may be folded into a substantially flat arrangement while still coupled to adjacent walls. The cage structure 20 may include one or more doors for permitting pet entry and egress from within the cage structure 20. For example, one or more walls may include a door pivotally supported so that it may move from a closed position, in which the door is substantially parallel to the wall, to an open position, in which the door is substantially perpendicular to the wall. Similarly, the top wall may include a door permitting access to the cage structure 20 via the top wall. The cage structure 20 may further include connector portions extending therefrom, wherein the connector portions may be configured to couple the cage structure 20 to the base structure 30.

Figure 2:
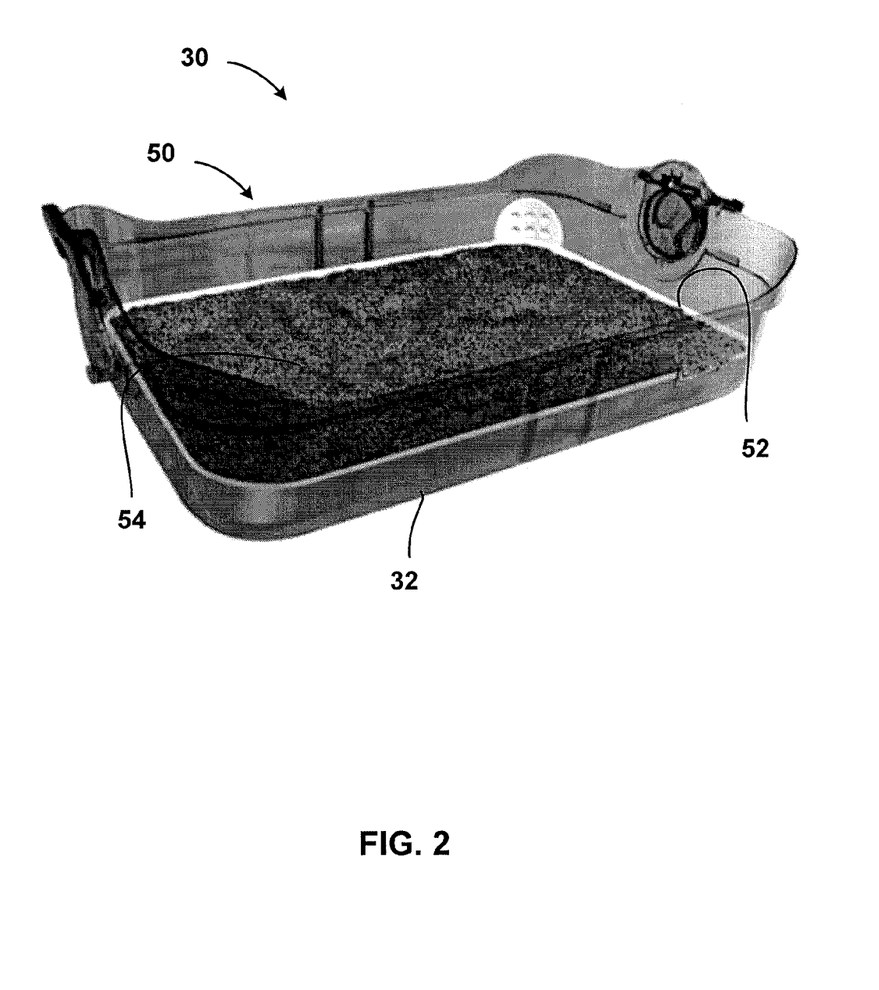
FIG. 2 is a perspective view of a base structure of the pet habitat of FIG. 1A with a disposable tray disposed within a reusable tray and with bedding material in the disposable tray.
Figure 3:
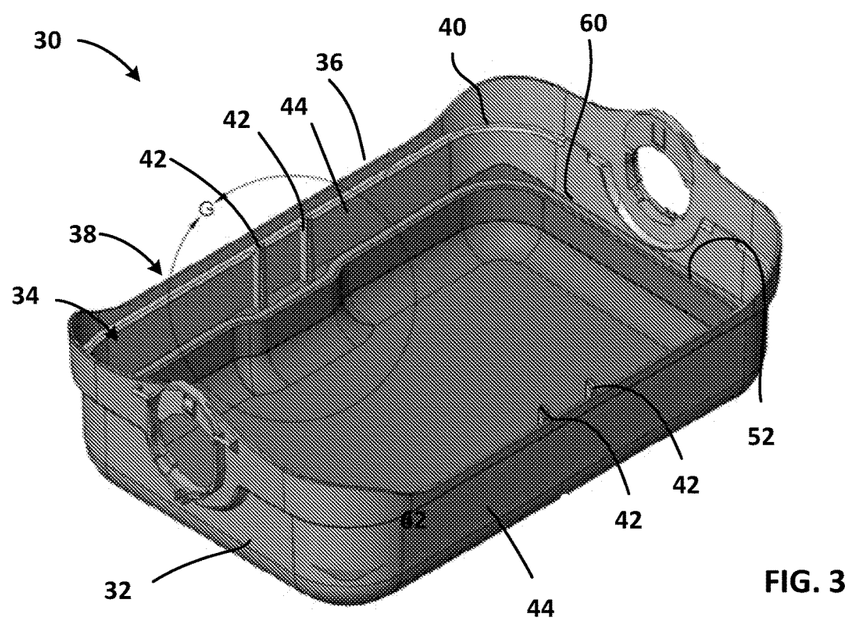
FIG. 3 is a perspective view of a base structure of the pet habitat of FIG. 1A with a disposable tray disposed within a reusable tray and without bedding material in the disposable tray.

As best shown by FIGS. 2-5, the base structure 30 may include a reusable (permanent) outer tray 32 and a disposable liner 50 contained therein. As shown by FIG. 2, the reusable outer tray 32 may include a horizontal floor which transitions via a curved transition region to vertical sidewalls which extend upwardly about the entire periphery of the floor, thereby forming reusable outer tray cavity 34 to receive disposable inner tray liner 50 therein. The reusable outer tray 32 may be particularly manufactured from a thermoplastic material by injection molding.

As shown, reusable outer tray 32 may be substantially rectangular in shape. The sidewalls may terminate at an upper edge 36 extending along a periphery of an opening 38 of the reusable outer tray 32 to cavity 34. As shown, the sidewall may include a landing 40 to receive and connect with an elongated mating portion of cage structure 20, thereby allowing the sidewalls of the cage structure 20 to securely rest upon the landing 40 of corresponding sidewalls of the reusable outer tray 32.

Figure 4:
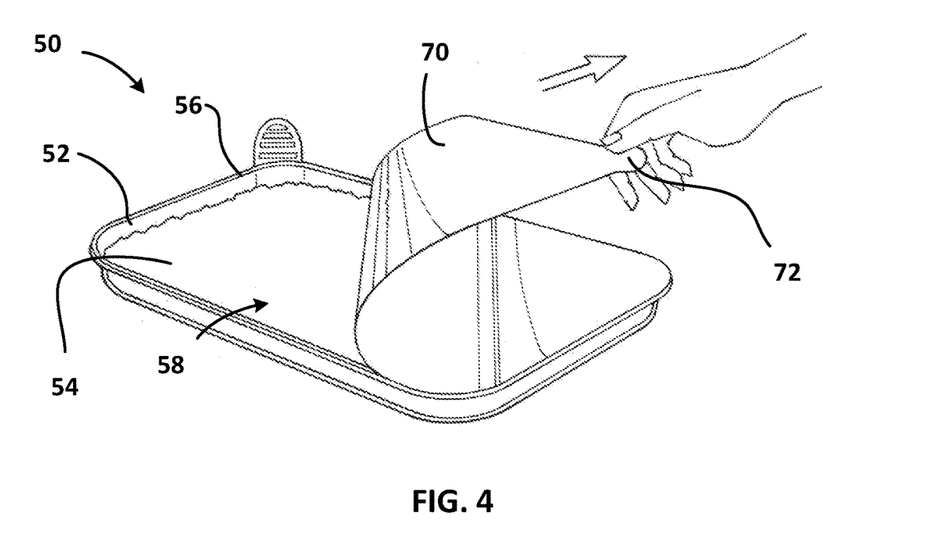
FIG. 4 is a perspective view of a disposable liner according to the present disclosure including a disposable tray, bedding material and a removable closure.

As shown best by FIG. 4, disposable liner 50 includes a performed disposable tray 52 containing disposable bedding material 54 for the pet(s) living in the habitat 10. Also as shown, the disposable tray 52 has an outer contour which substantially conforms to the inner contour of reusable outer tray 32. Similar to reusable outer tray 32, disposable tray 52 includes a horizontal floor which transitions via curved transition region to vertical sidewalls extending upwardly about the entire periphery of the floor. The disposable tray 52 may be particularly manufactured from a thermoplastic sheet material by thermoforming.

Prior to installation in reusable outer tray 32, the bedding material 54 may be sealed within the confines of the cavity of the disposable tray 52. More particularly, the bedding material 54 is sealed within the confines of a cavity of the disposable tray 52 by a transparent removable sheet closure 70 which may be bonded (e.g. heat sealed) to upper peripheral lip 56 of the disposable tray 52.

Figure 5:
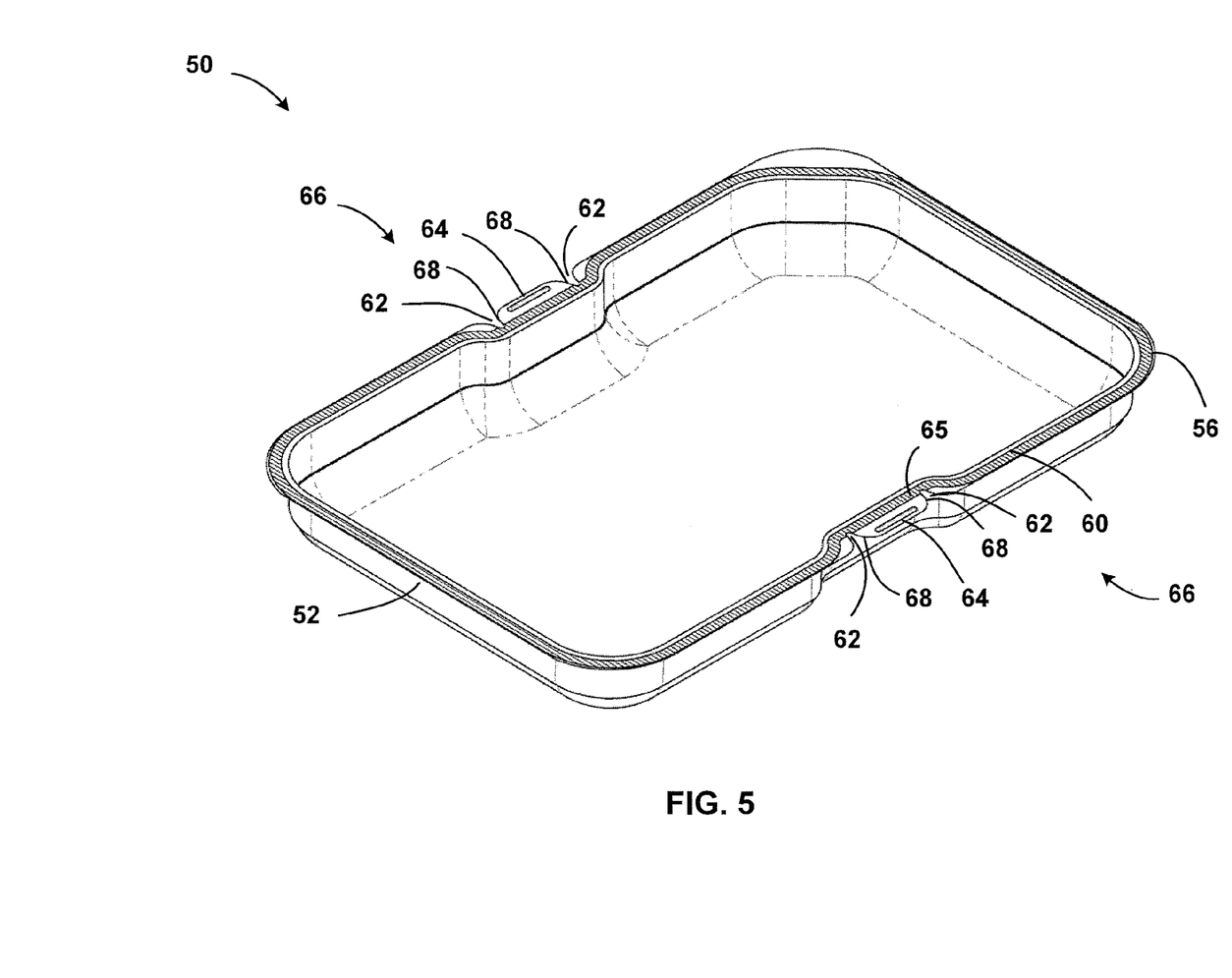
FIG. 5 is a perspective view of a disposable tray according to the present disclosure.

As best shown by FIG. 5, upper peripheral lip 56 extends completely and continuously around the periphery of opening 58 to the cavity of the disposable tray 52. During the manufacture of disposable liner 50, upper peripheral lip 56 provides a continuous sealing line 60 for sealing of removable sheet closure 70 to disposable tray 52 after bedding material 54 has been inserted in cavity thereof.

Figure 6:
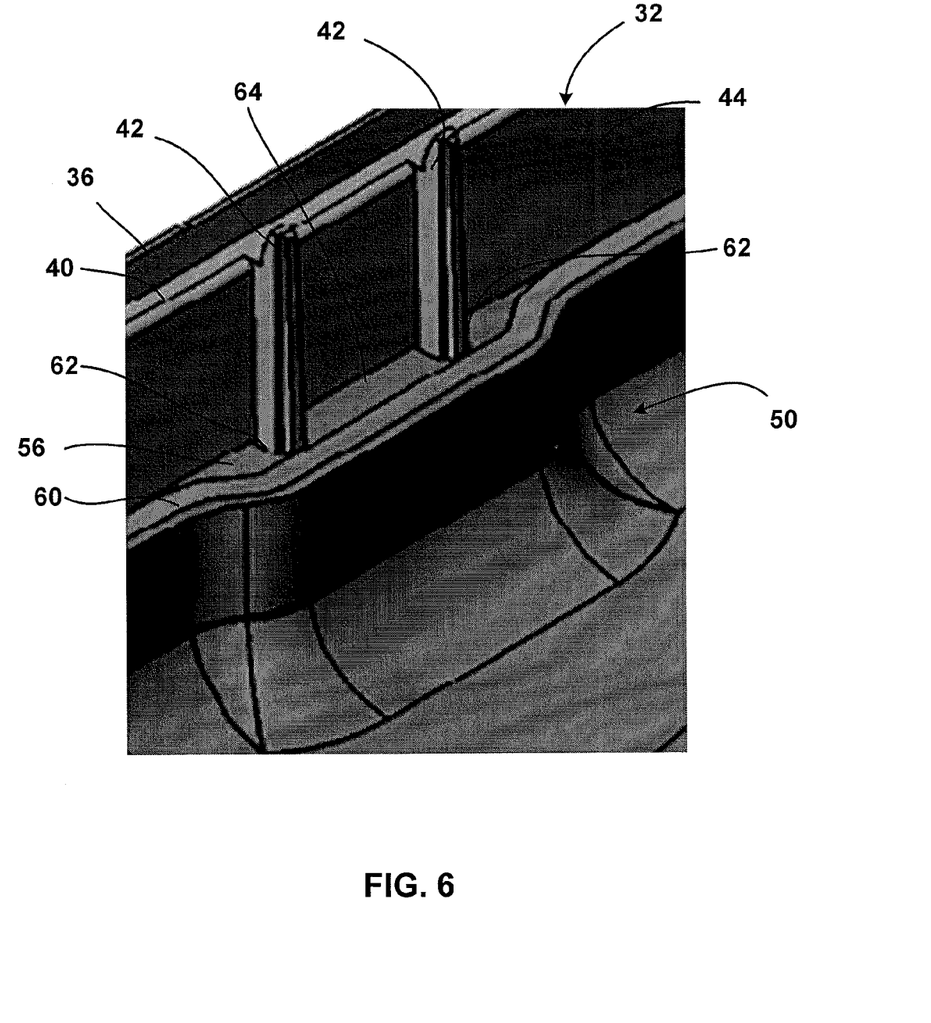
FIG. 6 is a perspective view of the portion of the base structure of the pet habitat of FIG. 4 within circle G.

As best shown by FIGS. 4-6, disposable liner 50 may be properly located in cavity 34 of reusable outer tray 32 by aligning a plurality of notches 62 formed in peripheral lip 56 on two opposing sides 66 of disposable tray 52 with a plurality of substantially parallel and vertical mating ribs 42 located on each of opposing sidewalls 44 of reusable outer tray 32. As shown, on each sidewall 44, ribs 42 extend upwards from the floor of reusable outer tray 32 and vertically along the sidewalls 44 towards opening 38 of reusable outer tray 32.

Once the disposable liner 50 is positioned such that the two ribs 42 of each sidewall 44 are located in the two notches 62 on each corresponding side of disposable tray 52, disposable liner 50 may then slide down the length of the ribs 42 and into cavity 34 with the two notches 62 traveling along the length of the two ribs 42.

As the disposable tray 52 slides into cavity 34, the air within cavity 34 may be displaced along upper peripheral lip 56. In certain embodiments, an interference fit may be formed by the lip 56 bearing against the sidewalls 44 of the reusable outer tray 32.

Once the disposable liner 50 is in proper position, a corner tab portion 72 of the removable sheet closure 70 may be lifted and peeled from the disposable tray 52 along the sealing line 60 to separate the removable sheet closure 70 from the disposable tray 52 and expose the bedding material 54 in the cavity of the disposable tray 52.

While the removable sheet closure 70 may also be removed from disposable tray 52 before the disposable tray 52 and bedding material 54 are inserted into cavity 34 of the reusable outer tray 32, preferably the removable sheet closure 70 is not removed until after the disposable liner 50 is properly positioned within cavity 34 of reusable outer tray 32. In this manner, the disposable bedding material 54 therein may not fall out of the disposable tray 52 and fall between the tray 52 and the reusable outer tray 32 as the disposable liner 50 is being loaded into the cavity 34 of the reusable outer tray 32. Thereafter the cage structure 20 may be assembled to the reusable outer tray 32 of base structure 30.

As such, the disposable tray 52 may be understood to be sized, particularly by the upper peripheral lip 56 forming an interference fit against the sidewalls of reusable outer tray 32, to inhibit the disposable bedding material 54 from falling between the disposable tray 52 and the reusable outer tray 32. Furthermore, such may also inhibit pet(s) living in the habitat 10 from separating the disposable tray 52 from the reusable outer tray 32, such as by attempting to peel the disposable tray 52 back in the corners and from getting between the disposable tray 52 and reusable outer tray 32.

After the disposable tray 52 and bedding material 54 has been used for a suitable period and needs replacement, cage structure 12 may be disassembled from the reusable outer tray 32, and thereafter the disposable liner 50, along with the disposable bedding material 54, as well as uneaten pet food and pet waste may be removed from reusable outer tray 32.

In order to more easily remove the disposable tray 52 from reusable outer tray 32, the disposable tray 52 may include two discrete deformable pull tabs 64 formed from a portion of the disposable tray peripheral lip 56. As shown deformable pull tabs 64 are preferably located between reusable outer tray ribs 42, which are preferably located at the center of the longitudinal length of reusable outer tray 32. As shown, the notches 62 in the lip 56 of the disposable tray 52 define the opposing ends 68 of the deformable pull tabs 64.

Most notably, the notches 62 enable the deformable pull tabs 64 to be deformed (bent) upward and rotated approximately 90 degrees to a grasping position approximately transverse to remainder of the lip 56. That is, the pull tabs 64 may be rotated along the edge 65 of the peripheral lip 56 where it is joined it can be appreciated that in preferred embodiment, the consumer may initially press down on the pull tabs with a finger and then pull upwardly and form a pinch grip. The pull tabs therefore may rotate up to 90 degrees into the open space and also, as noted, up to 90 degrees to a grasping position. Accordingly, the pull tab may have a range of motion over 180 degrees. The open space 63 (see FIG. 1A) between the outer tray ribs 42 allow for this procedure which open space is present between the disposable tray 52 and reusable outer tray 32.

Thereafter upon pulling the deformable pull tabs 64 upwards towards the opening 38 of cavity 34, the disposable tray 52 may lift out of the cavity 34. While being lifted out of the cavity 34, as a result of the disposable tray notches 62 being disposed around the reusable tray ribs 42, as well as the deformable pull tabs 64 being located there between, the disposable tray 52 may be removed from the reusable outer tray 32 while maintaining the disposable tray 52 substantially horizontal such that the contents therein, including the disposable bedding material 54, uneaten pet food and pet waste, do not fall out of the disposable tray 52 and into the reusable outer tray 32.

Thus, the present disclosure provides a pet habitat 10 comprising a cage structure 20 supported on a base structure 30, with the base structure 30 comprising a reusable tray 32 and a disposable liner 50. The disposable liner 50 comprises a disposable tray 52 locatable within the reusable tray 32, with the disposable tray having two opposing sides 66, wherein each of the opposing sides 66 includes a deformable pull tab 64 to separate the disposable tray 52 from the reusable tray 32.

Each deformable pull tab 64 may be formed from a portion of a peripheral lip 56 of the disposable tray 52. Each deformable pull tab 64 may be located between a plurality of notches 62 formed in the peripheral lip 56 on the opposing sides 66 of the disposable tray 52 with each deformable pull tab 64 having a length defined by opposing ends 68. Each notch 62 of the plurality of notches 62 formed on each of the opposing sides 66 of the disposable tray 52 may define one of the opposing ends 68 of each deformable pull tab 64.

The reusable tray 32 includes opposing sidewalls 44 corresponding to the opposing sides 66 of the disposable tray 52, wherein each sidewall 44 of the reusable tray 32 may include a plurality of ribs 42 extending vertically on the sidewall 44. Each rib 42 of the plurality of ribs 42 extending vertically on each of the opposing sidewalls 44 of the reusable tray 32 is locatable in one notch 62 of the plurality of notches 62 formed on each of the opposing sides 66 of the disposable tray 52.

The plurality of notches 66 formed on each of the opposing sides 66 of the disposable tray 52 and the plurality of ribs 42 extending vertically on each of the opposing sidewalls 44 of the reusable tray 32 are arranged such that the plurality of notches 62 may travel downward along a length of the plurality of ribs 42 as the disposable tray 52 is inserted into the removable tray 32 and may travel upward along the length of the plurality of ribs 42 as the disposable tray 52 is removed from the removable tray 32.

The present disclosure also provides a method of providing a pet habitat 10, comprising providing a base structure 30 comprising a reusable tray 32 and a disposable liner 50. The reusable tray 32 includes opposing sidewalls 44, wherein each sidewall 44 includes a plurality of ribs 42 extending vertically on the sidewall 44. The disposable liner 50 comprises a disposable tray 52 having opposing sides 66, wherein each of the opposing sides 66 includes a deformable pull tab 64 located between a plurality of notches 62 formed in a peripheral lip 56 of the disposable tray 52. The method further comprises positioning the plurality of ribs 42 extending vertically on each of the opposing sidewalls 44 of the reusable tray 32 within the plurality of notches 62 formed in the peripheral lip 56 on each of the opposing sides 66 of the disposable tray 52.

In certain embodiments, the method my further comprise bending each of the deformable pull tabs 64 upward, grasping each of the pull tabs 64 and pulling the each of the deformable pull tabs 64 upwards such that the disposable tray 52 moves upwards relative to the reusable tray 32 with the each of the deformable pull tabs 64 remaining between the plurality of ribs 42 extending vertically on each of the opposing sidewalls 44 of the reusable tray 32.

In certain embodiments, the method may further comprise moving the disposable tray 52 upward out of the reusable tray 32 such that the plurality of ribs 42 extending vertically on each of the opposing sidewalls 44 of the reusable tray 32 remain within the plurality of notches 62 formed in the peripheral lip 56 on each of the opposing sides 66 of the disposable tray 52 and the plurality of notches 62 formed in the peripheral lip 56 on each of the opposing sides 66 of the disposable tray 52 travel upwards along a length of the plurality of ribs 42 extending vertically on each of the opposing sidewalls 44 of the reusable tray 32 as the disposable tray 52 is removed into the reusable tray 32.

In certain embodiments, the method my further comprise moving the disposable tray 52 downward into the reusable tray 32 such that the plurality of ribs 42 extending vertically on each of the opposing sidewalls 44 of the reusable tray 32 remain within the plurality of notches 62 formed in the peripheral lip 56 on each of the opposing sides 66 of the disposable tray 52 and the plurality of notches 62 formed in the peripheral lip 56 on each of the opposing sides 66 of the disposable tray 52 travel downwards along a length of the plurality of ribs 42 extending vertically on each of the opposing sidewalls 44 of the reusable tray 32 as the disposable tray 52 is inserted into the reusable tray 32.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LIST OF REFERENCE CHARACTERS 10 pet habitat
20 upper cage structure
30 lower base structure
32 reusable outer tray
34 reusable outer tray cavity
36 reusable outer tray upper edge
38 reusable outer tray opening
40 reusable outer tray sidewall landing
42 reusable outer tray ribs
44 reusable outer tray opposing sidewalls
50 disposable liner
52 disposable tray
54 disposable bedding material
56 disposable tray upper peripheral lip
58 disposable tray opening
60 disposable tray sealing line
62 disposable tray notches
63 open space between ribs
64 disposable tray pull tabs
66 disposable tray opposing sides
70 removable sheet closure
72 removable sheet closure corner tab

What is claimed is:

1. A pet habitat comprising a cage structure supported on a base structure, wherein:
   the base structure includes a reusable tray configured to contain a disposable tray;
   the reusable tray comprises opposing sides, at least one of which includes a plurality of ribs extending vertically, and an open space is present between the ribs;
   the disposable tray comprises a disposable liner, a peripheral lip, and opposing sidewalls corresponding to the opposing sides of the reusable tray, wherein a plurality of notches are formed in the peripheral lip and define opposing ends of a deformable pull tab formed from the peripheral lip; and
   each rib of the plurality of ribs of the reusable tray is locatable in a corresponding one notch of the plurality of notches formed in the peripheral lip of the disposable tray; and
   the deformable pull tab is located within the open space between the ribs when the disposable tray is inserted within the reusable tray.

2. The pet habitat of claim 1 wherein the deformable pull tab is movable into the open space between the ribs and into a grasping position.

3. The pet habitat of claim 1 wherein the deformable pull tab is rotatable.

4. The pet habitat of claim 3 wherein the deformable pull tab is rotatable up to 90 degrees into the open space and up to 90 degrees into a grasping position.

5. The pet habitat of claim 1 wherein:
   the plurality of notches arranged such that they travel downward along a length of the plurality of ribs as the disposable tray is inserted into the reusable tray and travel upward along the length of the plurality of ribs as the disposable tray is removed from the reusable tray.

6. The pet habitat of claim 1 wherein:
   the disposable tray has a longitudinal length; and
   each deformable pull tab is located at the center of the longitudinal length.

7. The pet habitat of claim 1 wherein:
   the disposable liner comprises bedding material located within the disposable tray.

8. The pet habitat of claim 1 wherein:
   the disposable liner comprises a removable sheet closure bonded to the disposable tray along the peripheral lip of the disposable tray.

9. The pet habitat of claim 8 wherein:
   the removable sheet closure is heat sealed to the disposable tray along a continuous sealing line formed on the peripheral lip of the disposable tray.

10. The pet habitat of claim 8 wherein:
    the removable sheet closure is formed of thermoplastic material.

11. The pet habitat of claim 8 wherein:
    the disposable tray is formed of thermoplastic material.

12. The pet habitat of claim 8 wherein:
    the disposable tray is formed from a plastic sheet.

13. A disposable tray configured to be positioned within a reusable tray for a pet habitat, wherein the reusable tray includes opposing sides, at least one of which includes a plurality of ribs extending vertically, and an open space is present between the ribs, the disposable tray comprising:
    a peripheral lip;
    a plurality of notches formed in the peripheral lip;
    a deformable pull tab formed from the peripheral lip, wherein the plurality of notches define opposing ends of the deformable pull tab;
    a disposable liner; and opposing sidewalls corresponding to the opposing sides of the reusable tray, wherein:
each of the plurality of notches is configured such that when the disposable tray is inserted within the reusable tray, each rib of the plurality of ribs of the reusable tray is locatable in a respective one of the plurality of notches; and
the disposable tray is configured such that when the disposable tray is inserted within the reuseable tray, the deformable pull tab is located within said open space.

14. The disposable tray of claim 13 wherein the deformable pull tab is movable into the open space between the ribs and into a grasping position.

15. The disposable tray of claim 13 wherein the deformable pull tab is rotatable.

16. The disposable tray of claim 15 wherein the deformable pull tab is rotatable up to 90 degrees into the open space and up to 90 degrees into a grasping position.

17. The disposable tray of claim 13 wherein:
the plurality of notches are arranged such that the plurality of notches travel downward along a length of the plurality of ribs as the disposable tray is inserted into the removable tray and travel upward along the length of the plurality of ribs as the disposable tray is removed from the removable tray.

18. A method of providing a pet habitat, comprising:
providing a base structure comprising a reusable tray and a disposable tray, wherein:
the reusable tray includes opposing sides, at least one of which includes a plurality of ribs extending vertically, and an open space is present between the ribs;
the disposable tray comprises a disposable liner, a peripheral lip, and opposing sidewalls corresponding to the opposing sides of the reusable tray, wherein a plurality of notches are formed in the peripheral lip, the plurality of notches defining opposing ends of a deformable pull tab formed from the peripheral lip; and
positioning the plurality of ribs of the reusable tray within the plurality of notches formed in the peripheral lip of the disposable tray such that the deformable pull tab is located within the open space between the ribs.

19. The method of claim 18 further comprising:
moving the deformable pull tab into the open space between the ribs and then into a grasping position.

20. The method of claim 18 further comprising:
moving the disposable tray upward out of the reusable tray such that the plurality of ribs of the reusable tray remain within the plurality of notches of the disposable-tray and the plurality of notches of the disposable tray travel upwards along a length of the plurality of ribs of the reusable tray as the disposable tray is removed from the reusable tray.

21. The method of claim 18 further comprising:
moving the disposable tray downward into the reusable tray such that the plurality of ribs remain within the plurality of notches of the disposable tray and the plurality of notches of the disposable tray travel downwards along a length of the plurality of ribs of the reusable tray as the disposable tray is inserted into the reusable tray.

* * * * *